United States Patent
Forster et al.

(10) Patent No.: US 10,994,845 B2
(45) Date of Patent: May 4, 2021

(54) WASTE SYSTEM PRESSURE MANAGEMENT SYSTEM

(71) Applicant: B/E Aerospace, Inc., Winston-Salem, NC (US)

(72) Inventors: Charles F. Forster, Arlington, WA (US); Frank E. Hashberger, Snohomish, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 92 days.

(21) Appl. No.: 16/433,341

(22) Filed: Jun. 6, 2019

(65) Prior Publication Data
US 2020/0385121 A1    Dec. 10, 2020

(51) Int. Cl.
B64D 11/02    (2006.01)
E03F 1/00    (2006.01)

(52) U.S. Cl.
CPC .............. B64D 11/02 (2013.01); E03F 1/006 (2013.01)

(58) Field of Classification Search
CPC ............ B64D 11/02; E03D 5/00; E03F 1/006
USPC .............................................. 4/316, 321, 431
See application file for complete search history.

(56) References Cited

U.S. PATENT DOCUMENTS

| | | | |
|---|---|---|---|
| 3,995,328 A | 12/1976 | Carolan et al. | |
| 4,275,470 A * | 6/1981 | Badger | B64D 11/02 4/316 |
| 4,357,719 A * | 11/1982 | Badger | E03F 1/006 210/767 |
| 4,521,925 A * | 6/1985 | Chen | B64D 11/02 4/321 |
| 4,928,326 A * | 5/1990 | Olin | E03F 1/006 4/300 |
| 4,955,091 A * | 9/1990 | Grills | B64D 11/02 4/321 |
| 5,317,763 A | 6/1994 | Frank et al. | |
| 5,369,811 A * | 12/1994 | Serre | B61D 35/007 4/210 |
| 5,604,938 A * | 2/1997 | Tyler | B61D 35/007 4/321 |

(Continued)

FOREIGN PATENT DOCUMENTS

EP    1243711 A2    9/2002
WO    2008128925 A1    10/2008

*Primary Examiner* — David Colon-Morales
(74) *Attorney, Agent, or Firm* — Suiter Swantz pc llo (57) ABSTRACT

A system for waste system pressure management is disclosed. In one or more embodiments, the system includes an electronically controlled valve and a controller communicatively coupled to the electronically controlled valve. The electronically controlled valve is coupled to a suction path of an aircraft waste system. The controller is configured to determine a pressure differential between an aircraft cabin and a vacuum source for the suction path. The controller is further configured to generate one or more signals to actuate the electronically controlled valve from a first position to a second position to regulate a pressure in the suction path when the pressure differential between the aircraft cabin and the vacuum source exceeds a threshold pressure differential. In embodiments, the electronically controlled valve is configured to allow more airflow through the electronically controlled valve in the second position than in the first position.

14 Claims, 5 Drawing Sheets

(56) References Cited

U.S. PATENT DOCUMENTS

| | | | | |
|---|---|---|---|---|
| 6,006,373 A | * | 12/1999 | Hoang | E03F 1/006 |
| | | | | 4/321 |
| 6,349,424 B1 | * | 2/2002 | Stradinger | E03D 3/02 |
| | | | | 4/378 |
| 6,385,789 B1 | * | 5/2002 | Pondelick | B64D 11/04 |
| | | | | 4/427 |
| 6,453,481 B1 | * | 9/2002 | Pondelick | B64D 11/02 |
| | | | | 4/431 |
| 8,011,033 B2 | * | 9/2011 | Wierenga | B61D 35/007 |
| | | | | 4/664 |
| 8,185,977 B2 | * | 5/2012 | Seibt | E03F 1/006 |
| | | | | 4/431 |
| 8,397,318 B2 | * | 3/2013 | Seibt | B64D 11/02 |
| | | | | 4/316 |
| 8,607,370 B2 | * | 12/2013 | Hoang | E03F 1/006 |
| | | | | 4/430 |
| 9,015,872 B2 | * | 4/2015 | Seibt | B64D 11/02 |
| | | | | 4/431 |
| 9,126,686 B2 | * | 9/2015 | Seibt | E03D 11/18 |
| 2008/0178376 A1 | * | 7/2008 | Seibt | B64D 11/02 |
| | | | | 4/301 |
| 2010/0116935 A1 | * | 5/2010 | Rieger | B64D 11/02 |
| | | | | 244/118.5 |

\* cited by examiner

WASTE SYSTEM PRESSURE MANAGEMENT SYSTEM

BACKGROUND

Aircraft vacuum waste systems are often large centralized systems that use the differential pressure between the interior of an aircraft cabin and the atmosphere outside of the aircraft cabin to generate suction during flight. On ground, these systems may employ a vacuum blower for suction. Noise generated during a toilet flush increases when pressure differential across the toilet increases. This increased flush noise may be markedly increased when an aircraft is at cruising altitudes (i.e., when the waste system relies on a pressure differential between the aircraft cabin and the exterior atmosphere for suction) versus when the aircraft is on ground (i.e., when the waste system relies on a vacuum blower for suction). The increased flush noise may be unpleasant and/or disruptive to passengers. Thus, systems for waste system pressure management are needed so that the suction pressure, hence the flush noise, can be controlled.

SUMMARY

A system for waste system pressure management is disclosed. In one or more embodiments, the system includes an electronically controlled valve and a controller communicatively coupled to the electronically controlled valve. The electronically controlled valve is coupled to a suction path of an aircraft waste system. The controller is configured to determine a pressure differential between an aircraft cabin and a vacuum source for the suction path. The controller is further configured to generate one or more signals to actuate the electronically controlled valve from a first position to a second position to regulate a pressure in the suction path when the pressure differential between the aircraft cabin and the vacuum source exceeds a threshold pressure differential. In embodiments, the electronically controlled valve is configured to allow more airflow through the electronically controlled valve in the second position than in the first position.

In some embodiments of the system, the electronically controlled valve is coupled to a portion of the suction path between a waste tank and the vacuum source.

In some embodiments of the system, the electronically controlled valve is coupled to a portion of the suction path between a waste tank and a toilet.

In some embodiments of the system, the electronically controlled valve is also coupled to a flow path that directs air from the aircraft cabin into the suction path when the electronically controlled valve is in the second position.

In some embodiments of the system, the system further includes an end fitting coupled to the flow path to reduce noise generated by airflow through the electronically controlled valve.

In some embodiments of the system, the vacuum source is a connection to atmosphere outside the aircraft cabin.

In some embodiments of the system, the system further includes an additional vacuum source, wherein the additional vacuum source is a vacuum blower.

In some embodiments of the system, the controller is configured to maintain the electronically controlled valve in a closed position at altitudes requiring operation of the vacuum blower.

In some embodiments of the system, the electronically controlled valve is coupled to a portion of the suction path between a waste tank and the vacuum blower or between the vacuum blower and the connection to atmosphere outside the aircraft cabin.

An aircraft waste system is also disclosed. In one or more embodiments, the aircraft waste system includes a toilet disposed within an aircraft cabin, a waste tank, a vacuum source, and a suction path coupling the toilet, the waste tank, and the vacuum source. In embodiments, the aircraft waste system further includes an electronically controlled valve and a controller communicatively coupled to the electronically controlled valve. The electronically controlled valve is coupled to the suction path of the aircraft waste system. The controller is configured to determine a pressure differential between the aircraft cabin and the vacuum source. The controller is further configured to generate one or more signals to actuate the electronically controlled valve from a first position to a second position to regulate a pressure in the suction path when the pressure differential between the aircraft cabin and the vacuum source exceeds a threshold pressure differential. In embodiments, the electronically controlled valve is configured to allow more airflow through the electronically controlled valve in the second position than in the first position.

In some embodiments of the aircraft waste system, the electronically controlled valve is coupled to a portion of the suction path between the waste tank and the vacuum source.

In some embodiments of the aircraft waste system, the electronically controlled valve is coupled to a portion of the suction path between the waste tank and the toilet.

In some embodiments of the aircraft waste system, the electronically controlled valve is also coupled to a flow path that directs air from the aircraft cabin into the suction path when the electronically controlled valve is in the second position.

In some embodiments of the aircraft waste system, the aircraft waste system further includes an end fitting coupled to the flow path to reduce noise generated by airflow through the electronically controlled valve.

In some embodiments of the aircraft waste system, the vacuum source is a connection to atmosphere outside the aircraft cabin.

In some embodiments of the aircraft waste system, the system further includes an additional vacuum source, wherein the additional vacuum source is a vacuum blower.

In some embodiments of the aircraft waste system, the controller is configured to maintain the electronically controlled valve in a closed position at altitudes requiring operation of the vacuum blower.

In some embodiments of the aircraft waste system, the electronically controlled valve is coupled to a portion of the suction path between the waste tank and the vacuum blower or between the vacuum blower and the connection to atmosphere outside the aircraft cabin.

An aircraft waste system is also disclosed, in accordance with other embodiments of this disclosure. In one or more embodiments, the aircraft waste system includes a toilet disposed within an aircraft cabin, a waste tank, a vacuum source, and a suction path coupling the toilet, the waste tank, and the vacuum source. In embodiments, the aircraft waste system further includes a pressure regulator coupled to the suction path. The pressure regulator is configured to allow airflow through a flow path that directs air from the aircraft cabin into the suction path when a pressure in the suction path falls below a low pressure threshold.

In some embodiments of the aircraft waste system, the aircraft waste system further includes an end fitting coupled to the flow path to reduce noise generated by the airflow through the pressure regulator.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A pressure management system for an aircraft waste system is disclosed. In embodiments, the pressure management system regulates pressure in a suction path that couples one or more toilets, a waste tank, and a vacuum source with one another. When a pressure differential between an aircraft cabin and a vacuum source is above a predetermined threshold pressure differential (e.g., at certain cruising altitudes), the pressure management system may allow air to flow from an aircraft cabin into the suction path so that the suction path pressure is maintained above a low pressure threshold (e.g., above a predetermined/preset minimum suction path pressure). This may help reduce noise generated when flushing the one or more toilets.

Vacuum waste systems operate using a pressure differential between cabin pressure and suction path pressure. When the pressure differential between the cabin and the suction path increases, the noise generated during a flush sequence of the vacuum waste system may also increase. Thus, it is desirable to maintain the pressure differential between the cabin and the suction path within a range of pressures to both flush waste and also reduce the noise generated.

Vacuum waste systems depend on vacuum sources to create a negative pressure in the suction path so that waste can be pulled from a toilet into the waste tank. For example, some waste systems may employ a pressure differential between cabin pressure and atmospheric pressure as the vacuum source. Alternatively/additionally, some waste systems may employ a vacuum pump or blower configuration for operation when the difference between cabin pressures and atmospheric pressure is low (e.g., on-ground operation, unpressurized flight, lower altitude flights).

Figure 1A:
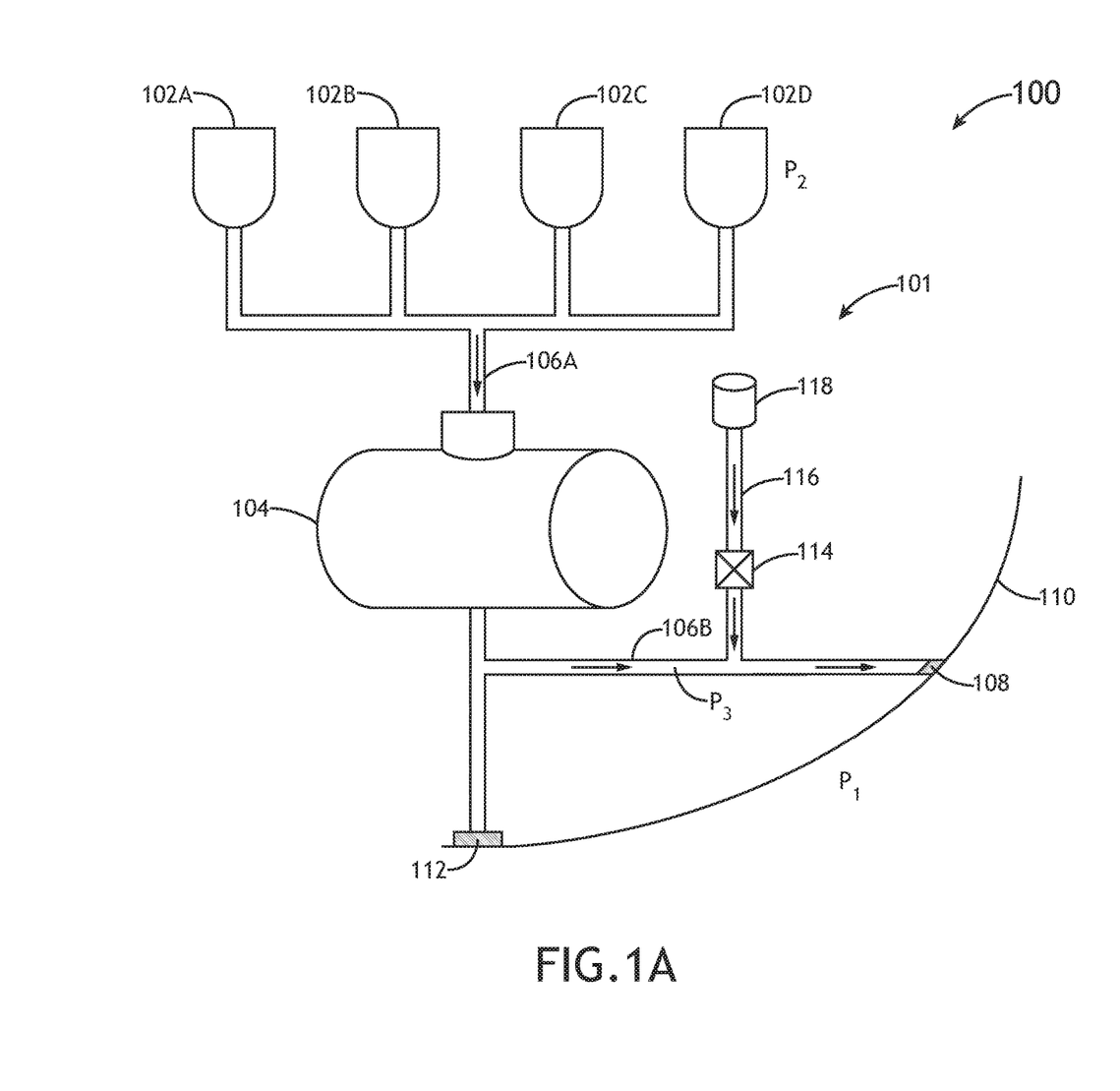
FIG. 1A is a schematic illustration of a waste system that includes a system for waste system pressure management, in accordance with one or more embodiments of this disclosure.
Figure 1B:
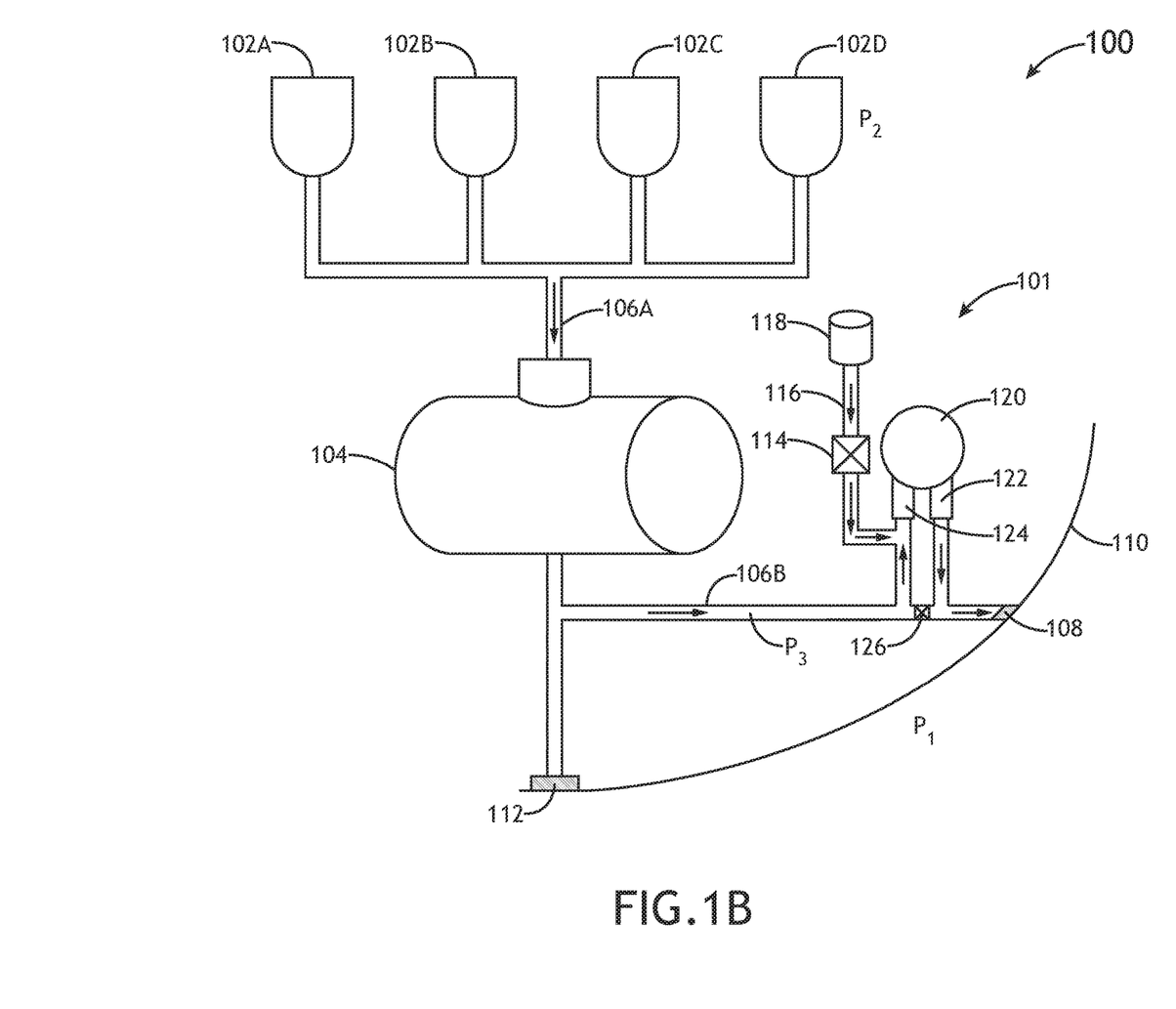
FIG. 1B is a schematic illustration of a waste system that includes a system for waste system pressure management, in accordance with one or more embodiments of this disclosure.

FIGS. 1A and 1B are schematic illustrations of an aircraft waste system 100, in accordance with one or more embodiments of this disclosure. In embodiments, the aircraft waste system 100 includes one or more toilets 102 (e.g., toilets 102A-102D), a waste tank 104, one or more vacuum source (e.g., vacuum blower 120 and/or a connection to atmosphere (discharge vent 108), a suction path 106, and a pressure management system 101. Pressure in the suction path 106 is regulated by the pressure management system 101 to reduce the noise generated during a flush sequence. Details of operation and configuration of components are provided below.

In embodiments, the vacuum source may be or may include a connection to atmosphere outside of the aircraft (e.g., via discharge vent 108), a pump (e.g., a pulsating (or "pulse type") pump, pneumatic pump, peristaltic pump, or the like), a vacuum blower 120, or any other source of negative pressure (e.g., a depressurized chamber/canister, etc.). In some embodiments, the aircraft waste system 100 may include two or more vacuum sources. For example, FIGS. 1B and 3B illustrate a waste system 100 with a first vacuum source (a connection to atmosphere outside of the aircraft via discharge vent 108) for use when the pressure differential between the cabin pressure (P2) and the atmospheric pressure (P1) outside the aircraft cabin 110 is above a predetermined pressure differential (e.g., at cruise altitudes) and a second vacuum source (e.g., vacuum blower 120) for use when the aircraft is on the ground or at lower altitudes. In such embodiments, the waste system 100 may include a check valve 126 that prevents backflow into the vacuum blower inlet 124 from the discharge vent 108 and/or vacuum blower outlet 122. In some embodiments, the second vacuum source may be or may include a vacuum generator that is structured and/or configured in accordance with one or more embodiments described in U.S. Pat. No. 8,607,370, titled "FLUSH VALVE AND VACUUM GENERATOR FOR VACUUM WASTE SYSTEM," which is incorporated herein by reference in its entirety.

The aircraft waste system 100 may include a vacuum valve (not depicted) between the waste tank 104 and the vacuum source (e.g., discharge vent 108 and/or vacuum blower 120). The vacuum valve may be configured to open when the vacuum source is suctioning air out of the waste tank 104 and configured to close after the vacuum source has suctioned air out of the waste tank 104 (e.g., to generate and maintain a negative pressure in the waste tank 104). Alternatively, the waste system may include no vacuum valve, such that a pressure along the suction path remains uniform.

The aircraft waste system 100 may further include a service panel 112 for accessing the suction path 106 and/or waste tank 104 through a port other than the discharge vent 108 or toilet 102 interface. The service panel 112 may provide an interface to perform maintenance service and repairs to the aircraft waste system 100 without having to remove any of the toilets 102.

In operation (e.g., during a toilet flush sequence), the vacuum source (e.g., discharge vent 108 and/or vacuum blower 120) may be configured to suction air out of the waste tank 104 to produce a negative pressure in the waste tank 104. The negative pressure in the waste tank 104 may act on a toilet 102 to pull waste from the toilet 102 into the waste tank 104. A flush valve may be located at or near the interface between the waste tank 104 and the toilet 102. In some embodiments, the negative pressure in the waste tank 104 may force open the flush valve. Alternatively, the flush valve may be mechanically or electromechanically actuated by a toilet flush lever, button, switch (e.g., switch 208), or the like. In some embodiments, the flush valve may be structured and/or configured in accordance with one or more embodiments described in U.S. Pat. No. 8,607,370, which has been incorporated herein by reference in its entirety.

The pressure management system 101 is configured to permit pressurized air to flow from the aircraft cabin 110 into the suction path 106, to reduce a pressure (P3) in the suction path 106 and/or pressure differential between a cabin pressure (P2) and the suction path pressure (P3). In this regard, the pressure management system 101 may be connected to the cabin, allowing pressurized air from the cabin to flow to the suction path 106. Alternatively, the pressure management system 101 may generate a pressure in the suction path 106 through another means, including, but not limited to, a pressurization system attached to an airplane exterior (e.g., the existing pressurization system or an additional pressurization system) or a compressed air tank.

In some embodiments, the pressure management system 101 is configured to prevent back flow of air from the suction path to the cabin. In this regard, the pressure management system 101 may prevent the cabin from filling up with any foul smelling odors that may come from the waste tank. The pressure management system 101 may prevent back flow of air by any suitable means, including, but not limited to: a control valve (e.g., electronic, hydraulic, or pneumatic) or a check valve (e.g., ball check valve, diaphragm check valve, swing check valve, flapper valve, stop-check valve, lift-check valve, in-line check valve, duckbill valve, pneumatic non-return valve, etc.).

The pressure management system 101 may be configured to prevent airflow from the cabin to the suction path 106 when a pressure differential between the cabin pressure (P2) and the suction path pressure (P3) is below a predetermined threshold pressure differential, in order to prevent loss of cabin pressure. When the pressure differential (P2–P3) is above the predetermined threshold pressure differential, the pressure management system 101 may permit airflow from the cabin to the suction path 106.

In embodiments, the pressure management system 101 includes an electronically controlled valve 114 coupled to the suction path 106 of the aircraft waste system 100. The electronically controlled valve 114 may be selectively actuated from a first position (e.g., closed or low flow position) to a second position (e.g., open or high flow position) to regulate the pressure differential between cabin pressure (P2) and suction path pressure (P3). For example, FIGS. 1A and 1B illustrate an electronically controlled valve 114 configured to regulate airflow through a pressure management system 101. The electronically controlled valve 114 may be any valve suitable for regulating the suction path pressure (P3), including, but not limited to, a ball valve, butterfly valve, choke valve, diaphragm valve, gate valve, globe valve, knife valve, needle valve, pinch valve, piston valve, plug valve, solenoid valve, and/or spool valve. In some embodiments, the first and/or second position may correspond to a closed and/or an open position of the valve. In this regard, the electronically controlled valve 114 may be held in a closed position until it is desirable to reduce a pressure differential between the cabin pressure (P2) and the suction path pressure (P3). For example, while operating the aircraft waste system 100 with the additional vacuum source (e.g., blower 120); it may be desirable to hold the electronically controlled valve 114 in a closed position. Alternatively, the first and/or second position may correspond to a position other than an open and/or a closed position of the valve, such as but not limited to a partially open and/or a partially closed position. In this regard, the flow rate of air through the pressure management system 101 may be selectively controlled as a function of valve position.

It is noted that the terms "first" and "second," as used herein, are not intended to imply any particular order or number of positions unless otherwise specified. In this regard, the electrically controlled valve 114 may be adjustable to any number of discrete positions or infinitely adjustable. For example, in some embodiments, the electronically controlled valve 114 may be transitioned from a first (current) position to a second (subsequent) position, third (subsequent) position, fourth (subsequent) position, and so on.

Figure 3A:
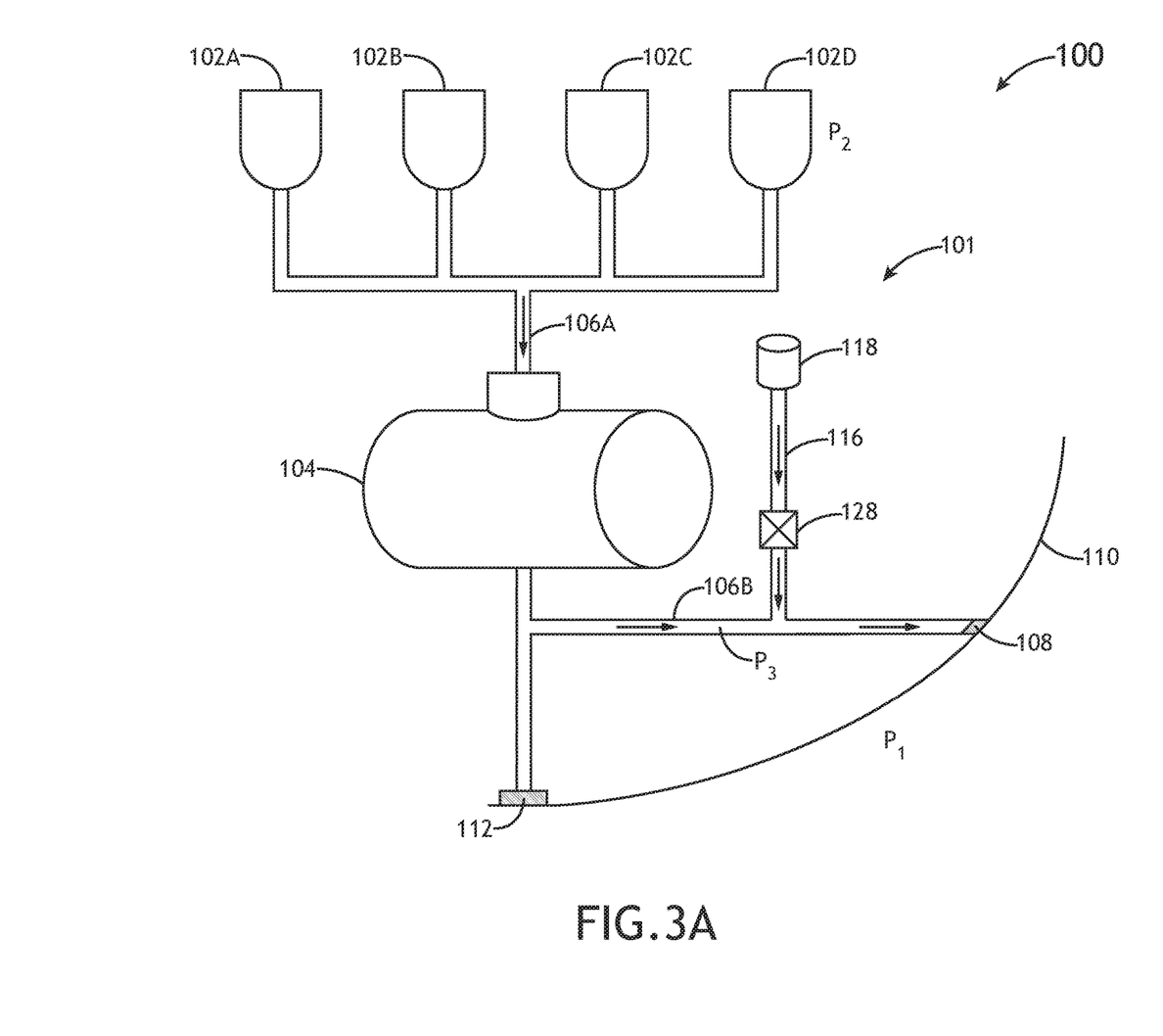
FIG. 3A is a schematic illustration of a waste system that includes a system for waste system pressure management, in accordance with one or more embodiments of this disclosure.
Figure 3B:
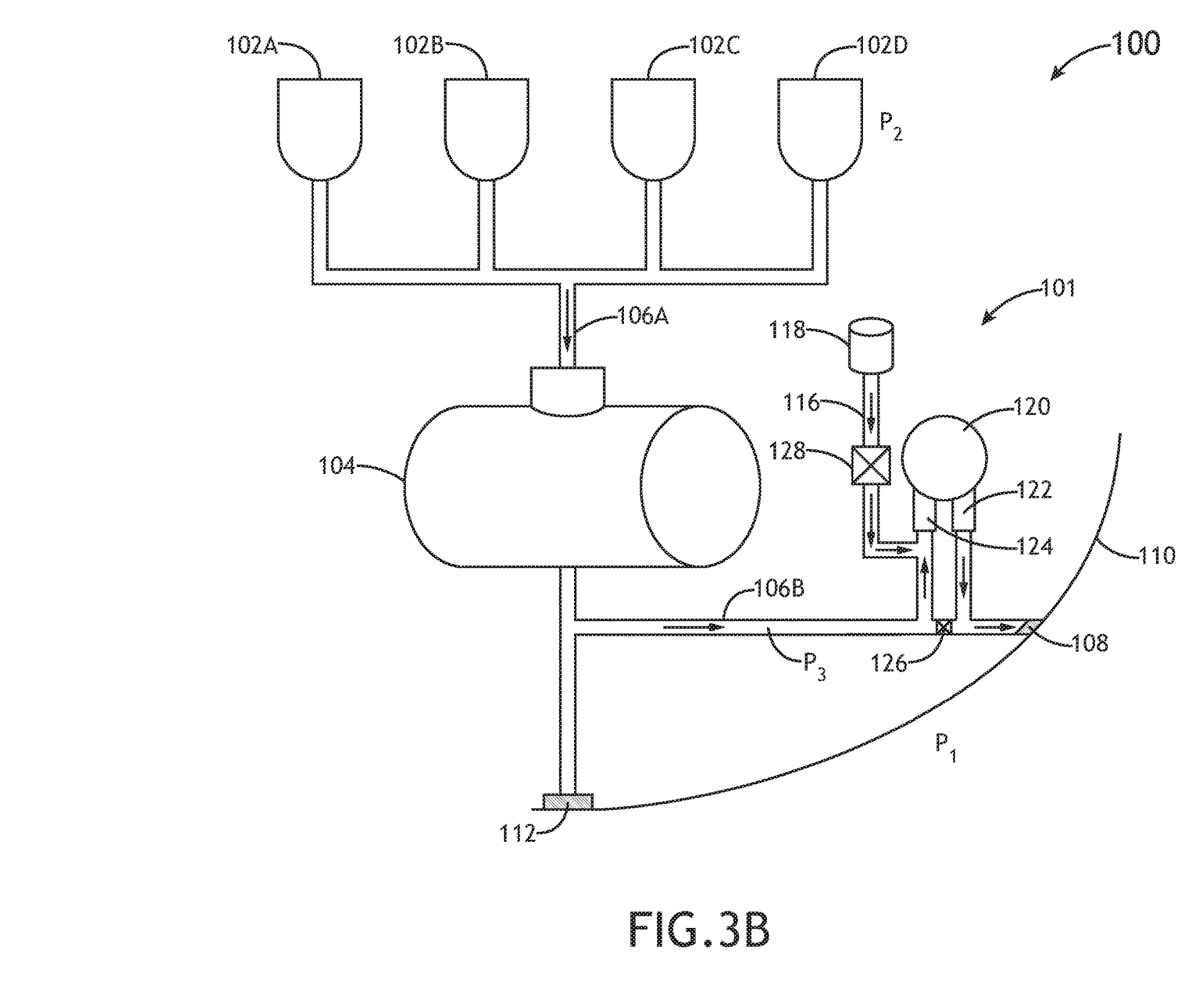
FIG. 3B is a schematic illustration of a waste system that includes a system for waste system pressure management, in accordance with one or more embodiments of this disclosure.

In some embodiments, such as the embodiments illustrated in FIGS. 3A and 3B, the pressure management system 101 may include a pressure regulator 128 instead of or in addition to the electronically controlled valve 114. The pressure regulator 128 may be configured to regulate the pressure differential between cabin pressure (P2) and suction path pressure (P3). In some embodiments, the pressure regulator 128 is a single stage regulator. Alternatively, the pressure regulator 128 may be a multiple stage regulator (e.g., two stage, three stage, etc.). The pressure regulator 128 may be configured to allow airflow through a flow path 116 that directs air from the aircraft cabin into the suction path 106 when a pressure (P3) in the suction path 106 falls below a low pressure threshold (e.g., below a predetermined/preset minimum suction path pressure) and/or when the pressure differential between cabin pressure (P2) and suction path pressure (P3) exceeds a threshold pressure differential.

In some embodiments, the pressure management system 101 is a separate component of the waste system 100. In this regard, the pressure management system 101 may be installed in aircrafts as an add-on to the waste system 100 or retrofitted onto existing waste systems 100. Furthermore, the pressure management system 101 may not adversely impact existing equipment certifications while reducing the noise levels associated with flushing the existing waste systems 100.

The pressure management system 101 may be coupled to a portion 106б of the suction path 106 between the waste tank 104 and at least one of the vacuum source(s) (e.g., between the waste tank 104 and the vacuum blower inlet 124, connection to atmosphere (e.g., discharge vent 108), etc.). Alternatively, the connection point may be between the vacuum blower outlet 122 and a connection to atmosphere (e.g., discharge vent 108). In other embodiments, the pressure management system 101 may be coupled to a portion 106A of the suction path 106 between the waste tank 104 and the one or more toilets 102. The pressure management system 101 may be coupled to any portion of the suction path 106 that allows for regulation of the pressure differential between cabin pressure (P2) and suction path pressure (P3), possibly even the waste tank 104.

In some embodiments, the pressure management system 101 includes an end fitting 118 coupled to a flow path 116 that directs air from the cabin into the suction path 106 via the electronic valve 114/pressure regulator 128. The end fitting 118 may be configured to permit airflow to the suction path 106. The end fitting 118 may be further configured to reduce noise generated when air flows to the suction path 106. For example, the end fitting 118 may include a diffuser, silencer, regulator, damper, or the like. In some embodiments, the end fitting 118 may be located away from passenger seating to prevent passengers from hearing noises created from the airflow from the cabin to the suction path 106.

In some embodiments, the pressure management system 101 is configured to receive or measure data regarding a pressure differential between cabin pressure (P2) and suction path pressure (P3) and/or a pressure differential between cabin pressure (P2) and atmospheric pressure (P1) outside the aircraft cabin 110. In this regard, the pressure differential may be measured or calculated from measurements using any method, including, but not limited to, gauges, sensors, and/or transducers. The pressure management system 101 may be configured to regulate the pressure (P3) in the suction path or the pressure differential (P2-P3) between the cabin pressure (P2) and suction path pressure (P3) based on signals from a controller (e.g., controller 200). In this regard, the pressure differential (P2-P3) may be controlled by open loop feedback or closed loop feedback.

Figure 2:
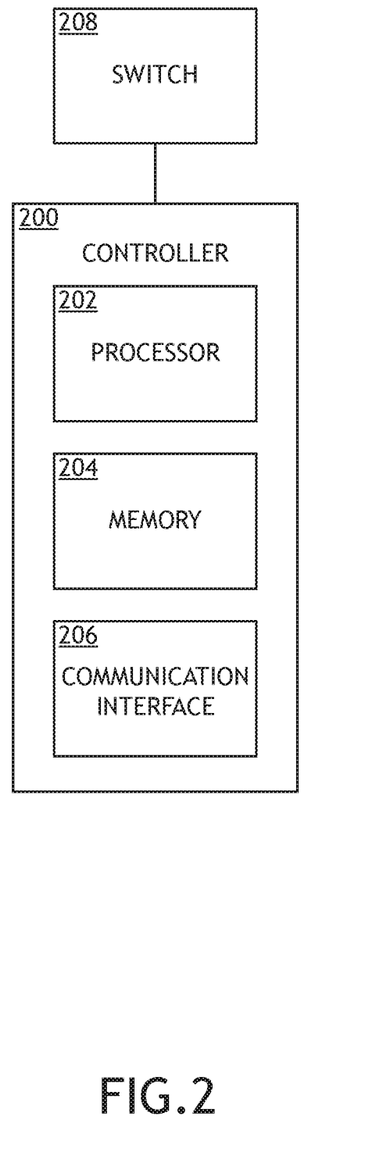
FIG. 2 is a block diagram illustrating a controller for a waste system, such as the waste system illustrated in FIG. 1A or FIG. 1B, in accordance with one or more embodiments of this disclosure.

The vacuum source, valves (e.g., electronically controlled valve 114), and/or any other electronic/electromechanical components (e.g., actuators, sensors, etc.) of the aircraft waste system 100 and/or the pressure management system 101 may be electronically controlled. For example, FIG. 2 illustrates a controller 200 that can be configured to signal the components to perform a toilet flush sequence when a switch 208 coupled to the controller 200 is toggled, flipped, electronically switched, or otherwise triggered. The controller may be further configured with steps/operations to control the vacuum pressure differential across a toilet 102 by allowing cabin air to enter the suction path 106 of the aircraft waste system 100.

The switch 208 may be any type of electronic or electromechanical switch. In some embodiments, the switch 208 is an electromechanical switch that is triggered when a toilet handle or lever is pushed, pulled, or turned, or when a flush button is pushed. In other embodiments, the switch 208 may include or may be coupled to a proximity detector (e.g., optical sensor) that triggers the switch 208 based on sensing presence of a new user, departure of a current/previous user, or the like. The switch 208 can also be triggered based signals from a capacitive touch sensor or a gesture control sensor. In general, the switch 208 can be triggered by any type of human machine interface for activating the toilet flush sequence without departing from the scope of this disclosure.

The controller 200 may be communicatively coupled to the switch 208, the vacuum source, and one or more valves (e.g., electronically controlled valve 114) of the aircraft waste system 100 or the pressure management system 101. The controller 200 may be configured to operate the vacuum source and the one or more valves in response to a signal from the switch 208. Furthermore, the controller 200 may be configured to regulate the airflow through the pressure management system 101 based on measured, calculated, or otherwise detected pressure differentials between cabin pressure (P2) and suction path pressure (P3), or cabin pressure (P2) and atmospheric pressure (P1). In embodiments, the controller 200 may include a processor 202, memory 204, and a communication interface 206.

The processor 202 provides processing functionality for at least the controller 200 and can include any number of processors, micro-controllers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques described herein. The processor 202 is not limited by the materials from which it is formed, or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the controller 200/processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a wired and/or wireless connection. The controller 200 may be connected to one or more input/output (I/O) devices (e.g., switch 208, sensors, etc.), system components (e.g., vacuum source, valve 114, etc.), and so forth via the communication interface 206. In embodiments, the communication interface 206 may include a transmitter, receiver, transceiver, physical connection interface, or any combination thereof.

In some embodiments, the controller 200 may be configured to receive a flush command (e.g., signal) that initiates a toilet flush sequence via the switch 208. In response, the controller 200 may open a flush valve to pull waste from a toilet 102 into the waste tank 104. In some embodiments, the controller 200 may be further configured to open a vacuum valve and cause the vacuum source to suction air out of the waste tank 104 through the vacuum valve to generate a negative pressure in the waste tank 104 so that the waste is pulled from the toilet 102 into the waste tank 104.

In embodiments, prior to and/or during the flush sequence, the controller 200 is configured to determine a pressure differential between an aircraft cabin pressure (P2) and a vacuum source pressure for the suction path 106 (e.g., atmospheric pressure (P1) or suction path pressure (P3)). For example, the controller 200 may be configured to receive a pressure differential measurement/calculation from an aircraft control system (e.g., a flight management system), detect the respective pressures or a pressure differential via one or more sensors onboard the aircraft, and/or determine the respective pressures or a pressure differential based on one or more flight parameters (e.g., altitude). The controller 200 is further configured to generate one or more signals to actuate the electronically controlled valve 114 from a first position (e.g., closed or low flow position) to a second position (e.g., open or high flow position) to regulate a pressure (P3) in the suction path 106 when the pressure differential between the aircraft cabin and the vacuum source exceeds a threshold pressure differential. In embodiments, the electronically controlled valve 114 is configured to allow more airflow (e.g., via flow path 116) through the electronically controlled valve 114 in the second position than in the first position, thus allowing air from the aircraft cabin to enter the suction path 106 and reduce the pressure differential (P2–P3) between the aircraft cabin and the suction path 106. This serves to reduce flush noise resulting from the presence of a very high pressure differential (P2–P3) between the aircraft cabin and the suction path 106.

In embodiments, when the pressure management system 101 is active, the suction path pressure (P3) is maintained above a threshold pressure that is greater than the atmospheric pressure (P1) outside the aircraft but less than the cabin pressure (P2). The pressure management system 101 may be selectively activated when the aircraft is at an altitude (e.g., a cruising altitude) that does not require operation of the vacuum blower 120. For example, the controller 200 may be configured to maintain the electronically controlled valve 114 in a first (e.g., closed) position when the aircraft is at an altitude (e.g., ground or low altitude) requiring operation of the vacuum blower 120 and may be configured to selectively actuate (e.g., open/close) the electronically controlled valve 114 when the aircraft is at an altitude (e.g., cruising altitude) allowing for suction provided by the connection to atmosphere (e.g., discharge vent 108) as the vacuum source for the aircraft waste system 100.

It is to be understood that implementations of the methods disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for waste system pressure management, comprising:
   an electronically controlled valve coupled to a suction path of an aircraft waste system; and
   a controller communicatively coupled to the electronically controlled valve, the controller configured to:
      determine a pressure differential between an aircraft cabin and a vacuum source for the suction path; and
      generate one or more signals to actuate the electronically controlled valve from a first position to a second position to regulate a pressure in the suction path when the pressure differential between the aircraft cabin and the vacuum source exceeds a threshold pressure differential, wherein the electronically controlled valve is configured to allow more airflow through the electronically controlled valve in the second position than in the first position, wherein the electronically controlled valve is coupled to a portion of the suction path between a waste tank and the vacuum source.

2. The system of claim 1, wherein the electronically controlled valve is also coupled to a flow path that directs air from the aircraft cabin into the suction path when the electronically controlled valve is in the second position.

3. The system of claim 2, further comprising an end fitting coupled to the flow path to reduce noise generated by airflow through the electronically controlled valve.

4. The system of claim 1, wherein the vacuum source comprises a connection to atmosphere outside the aircraft cabin.

5. The system of claim 4, further comprising an additional vacuum source, wherein the additional vacuum source comprises a vacuum blower.

6. The system of claim 5, wherein the controller is configured to maintain the electronically controlled valve in a closed position when the aircraft cabin is at an altitude requiring operation of the vacuum blower.

7. The system of claim 5, wherein the electronically controlled valve is coupled to a portion of the suction path between a waste tank and the vacuum blower or between the vacuum blower and the connection to the atmosphere outside the aircraft cabin.

8. An aircraft waste system, comprising:
a toilet disposed within an aircraft cabin;
a waste tank;
a vacuum source;
an additional vacuum source, wherein the additional vacuum source comprises a vacuum blower;
a suction path coupling the toilet, the waste tank, and the vacuum source;
an electronically controlled valve coupled to the suction path; and
a controller communicatively coupled to the electronically controlled valve, the controller configured to:
determine a pressure differential between the aircraft cabin and the vacuum source; and
generate one or more signals to actuate the electronically controlled valve from a first position to a second position to regulate a pressure in the suction path when the pressure differential between the aircraft cabin and the vacuum source exceeds a threshold pressure differential, wherein the electronically controlled valve is configured to allow more airflow through the electronically controlled valve in the second position than in the first position, wherein the controller is configured to maintain the electronically controlled valve in a closed position when the aircraft cabin is at an altitude requiring operation of the vacuum blower.

9. The aircraft waste system of claim 8, wherein the electronically controlled valve is coupled to a portion of the suction path between the waste tank and the vacuum source.

10. The aircraft waste system of claim 8, wherein the electronically controlled valve is also coupled to a flow path that directs air from the aircraft cabin into the suction path when the electronically controlled valve is in the second position.

11. The aircraft waste system of claim 10, further comprising an end fitting coupled to the flow path to reduce noise generated by airflow through the electronically controlled valve.

12. The aircraft waste system of claim 8, wherein the vacuum source comprises a connection to atmosphere outside the aircraft cabin.

13. The aircraft waste system of claim 8, wherein the electronically controlled valve is coupled to a portion of the suction path between the waste tank and the vacuum blower or between the vacuum blower and the connection to the atmosphere outside the aircraft cabin.

14. An aircraft waste system, comprising:
a toilet disposed within an aircraft cabin;
a waste tank;
a vacuum source;
a suction path coupling the toilet, the waste tank, and the vacuum source;
an electronically controlled valve coupled to the suction path; and
a controller communicatively coupled to the electronically controlled valve, the controller configured to:
determine a pressure differential between the aircraft cabin and the vacuum source; and
generate one or more signals to actuate the electronically controlled valve from a first position to a second position to regulate a pressure in the suction path when the pressure differential between the aircraft cabin and the vacuum source exceeds a threshold pressure differential, wherein the electronically controlled valve is configured to allow more airflow through the electronically controlled valve in the second position than in the first position, wherein the electronically controlled valve is coupled to a portion of the suction path between the waste tank and the vacuum source.

* * * * *